June 20, 1967 — S. J. RUDY — 3,326,307

ROCK BIT ROLLER CONE

Filed Jan. 28, 1965 — 2 Sheets-Sheet 1

INVENTOR.
STEPHEN J. RUDY
BY Nicholas J. Garofalo
ATTORNEY

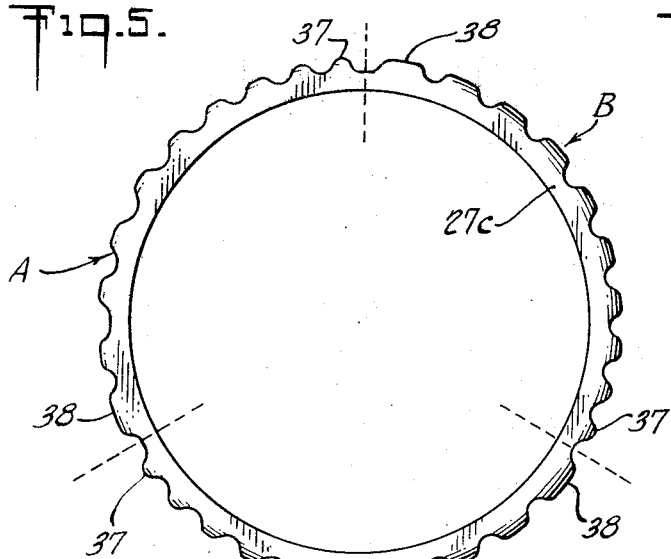
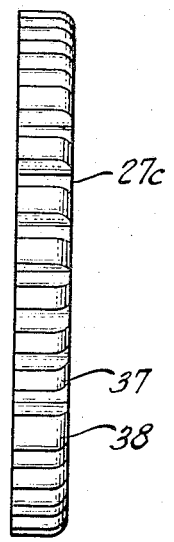
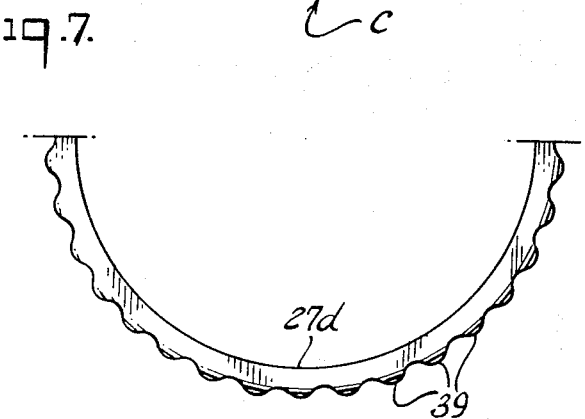
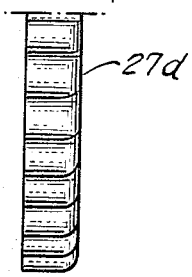
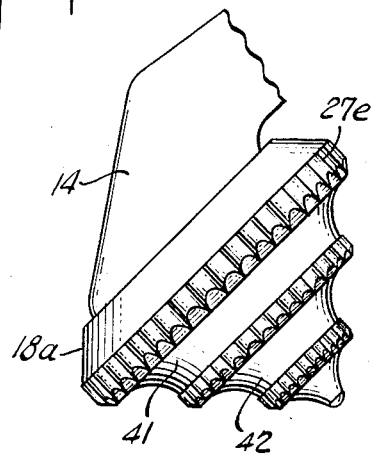
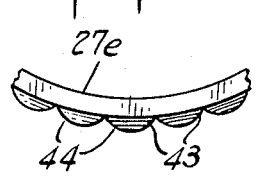
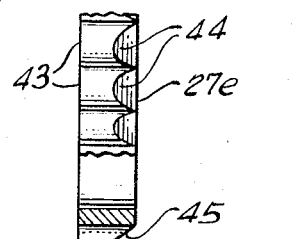
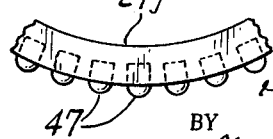
INVENTOR.
STEPHEN J. RUDY
BY Nicholas J. Garofalo
ATTORNEY United States Patent Office 3,326,307
Patented June 20, 1967

3,326,307
ROCK BIT ROLLER CONE
Stephen J. Rudy, Greenwich, Conn., assignor to Chicago Pneumatic Tool Company, New York, N.Y., a corporation of New Jersey
Filed Jan. 28, 1965, Ser. No. 428,751
2 Claims. (Cl. 175—374)

ABSTRACT OF THE DISCLOSURE

A rock drill bit carrying cutters of a type having a coned body mounted upon a spindle and having teeth projecting from the surface of the body, wherein the teeth are provided about the surfaces of annular bands, and the coned body is provided with steps about its periphery upon each of which a separate one of the bands is fitted.

The invention relates to the art of roller cone rock drill bits, the teeth of which are provided upon separate band elements.

The usual rock drill bit comprises a supporting head from which depends a group of legs, each having an inwardly and downwardly extending spindle upon which is rotatably mounted a roller cone cutter having a plurality of cutting teeth projecting from its surface. In some conventional cutters, the teeth are formed integrally with the body of the cutter; in others, the teeth are inserted therein.

It has been found that teeth which have rounded crests and project only slightly from the surface of the cutter are especially suitable for use in rough drilling operations wherein very hard rock such as quartzite, granite and others are encountered. Teeth of this structure tend to roll over and fracture the rock with a crushing action, whereas teeth of the chisel type tend to slice the rock. The round crested tooth has less tendency to chip than the chisel type tooth; and, when properly hardened, is less subject to wear. The process of hardening the teeth for rough drilling use is costly; and is particularly so when the inserted type of tooth is used, since the latter is usually formed of expensive carbides.

A fault with those cutters having teeth integrally formed therein is that the cutter is of little use after the teeth have become substantially worn or chipped.

A fault of those cutters having inserted teeth is the difficulty of rigidly and closely associating the teeth in the body of the cutter because of the need of a separate hole for each tooth. A further difficulty with the insert type of tooth is that it is subject to becoming dislodged or loosened during very rough drilling operations.

A further fault of cutters of both the integral and inserted tooth type is the difficulty in the manufacturing process of cutting the teeth on the cutter to a particular shape, or of inserting the teeth in the body of the cutter. Difficulties of hardening the teeth are also involved.

In accordance with the invention, there is provided in a rock bit a roller cone having a peripheral notch in which is seated an annular band having teeth arranged about its surface in successive groups, the teeth in each group varying progressively from one another in their circumferential dimensions.

There is further provided in accordance with the invention in a rock bit a roller cone cutter having a coned body provided with a plurality of concentrically disposed steps about its periphery in each of which is seated an annular band of teeth, wherein the inner diameter wall of the band and a wall adjacent thereto are co-extensive with and lie flush upon corresponding walls of the related step.

In the accompanying drawings:

FIGS. 5 and 6 are views similar respectively to those of FIGS. 2 and 3 but disclosing an annular band modified with respect to the arrangement and form of the teeth thereon;

FIGS. 7 and 8 are respectively end and peripheral surface views in half section of an annular band showing a further modification in the arrangement and form the teeth;

FIG. 9 is a view similar to that of FIG. 8 but in partial section and showing an annular band having a still further form of the teeth;

FIG. 10 is a fragmentary left end view of FIG. 9;

Figure 1:
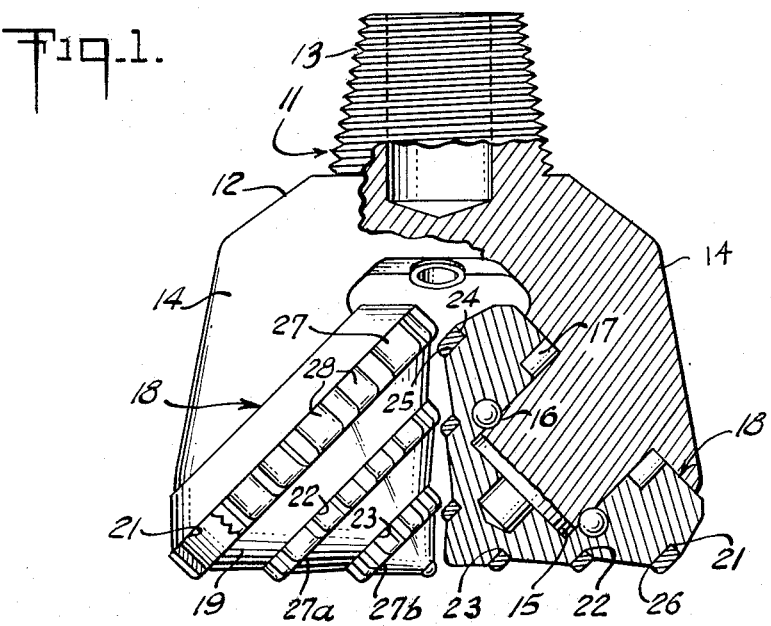
FIG. 1 is an elevational view partly in section disclosing a rock drill bit having roller cone cutters embodying the invention.

FIG. 11 discloses a roller cone upon which a plurality of the bands of the type disclosed in FIG. 9 have been mounted; and FIG. 12 discloses in side elevation a view of a fragmentary portion of an annular band having teeth of the insert type.

Reference is directed to the several figures of the drawings; and now especially to FIGS. 1 to 4 wherein there is disclosed a rock drill bit generally designated 11 having a conventional head 12 from the upper end of which axially extends a threaded pin 13 adapted to be screwed into a pin box (not shown) of a drill string. The head has the usual number of three depending legs 14, of which two are shown, arranged symmetrically about the axis of rotation of the bit. Each leg has the usual downwardly and inwardly inclined shaft or spindle 15 upon which is rotatably mounted on conventional bearing elements 16 and 17 a roller cone cutter 18, the body of which is of generally coned configuration. The angle of each spindle 15 relative to its leg 14 is such that the cutter element 18 mounted thereon is adapted to roll over the bottom of a bore hole.

The body of the cutter is stepped in its coned surface 19 so as to provide around the latter a plurality of separate annular notches or steps 21, 22 and 23 in spaced relation to one another and in concentric relation to the axis of rotation of the cutter. Each step is of substantially L-form. Step 21 has an inwardly extending annular shoulder 24 and an adjacent downwardly extending annular shoulder 25. Steps 22 and 23 are provided with similar shoulders. Here, the downwardly extending shoulder 25 is parallel to the axis of rotation of the cutter and terminates at its lower end 26 at the surface of the cutter; and the inwardly extending shoulder 24 is here shown as being radial to or at right angles to said axis.

Seated in the step 21 is an annular band or ring 27 having integrally formed about its periphery a succession of cutter teeth 28. Similar rings, but of lesser diameters designated by the numerals 27a and 27b, are respectively and similarly seated in the steps 22 and 23. The band 27 has an inner diameter wall 29 which is seated flush upon the downwardly extending shoulder 25 of the step 21; and it has an axial height corresponding to that of the shoulder 25. Band 27 further has a squared or level upper end wall 31 which is seated flush against the upper radial shoulder 24 of the corresponding step. The seated relation of the band relative to its step is of significance in that as a result thereof the peripheral faces 32 of the teeth as well as the adjacent corners 33 and the bottom wall 34 of the band extend beyond the coned surface 19 of the cutter. Further, the flush fit of the upper end wall 31 of the ring with the corresponding shoulder 24 of the cutter prevents dirt from the bore hole entering therebetween and wedging the ring loose of its seat. The inner wall 29 of the band preferably does not extend below the bottom point 26 of the shoulder 25. This serves to avoid outward thrusts against the band by debris at the bottom of the hole.

Figure 2:
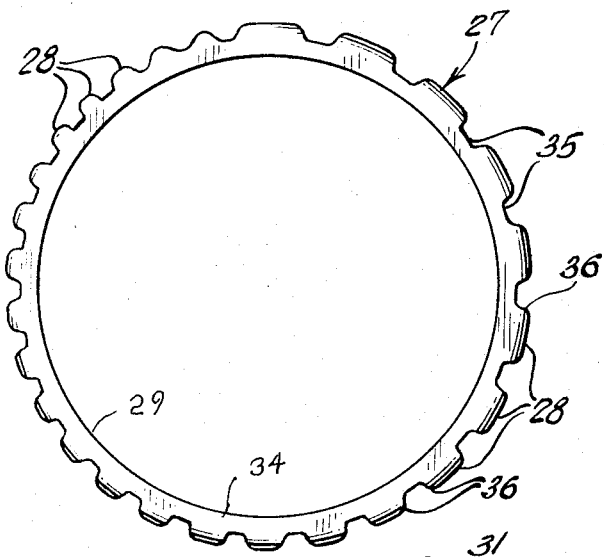
FIG. 2 is a bottom plan view of one of the annular bands apart from the roller cone having cutter teeth formed about its periphery.
Figure 3:
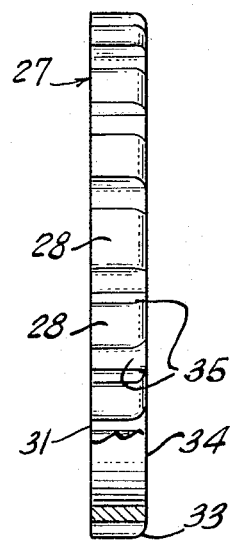
FIG. 3 is a side view of the peripheral surface of the band shown in FIG. 2.
Figure 4:
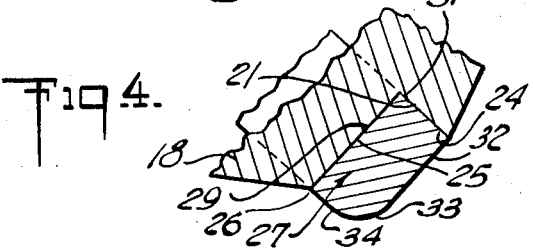
FIG. 4 is an enlarged fragmentary detail in section of FIG. 1 showing the mounted relation of the band to the roller cone.

Each band of teeth is fitted and secured in suitable manner to the body of the cutter as by shrinking, press fitting or other suitable method so that it will be rigidly seated and maintained in its step. The teeth of the band 27, as indicated in FIGS. 2 and 3, are separated from one another by parallel vertical grooves 35. Vertical edges 36 of the grooves, as well as the peripheral bottom-most outer corners or crests 33 of the teeth, are rounded. By means of this construction, a ring of teeth is provided by the band about the cutter, each of the teeth of which has a rounded outer and bottom-most crest 33 projecting slightly beyond the coned surface of the cutter. The teeth as well as the band is of hardened structure, whereby the the teeth are suitable for use in rough drilling operations wherein very hard rock, such as quartzite, granite and the like, are encountered. The band and teeth may be formed of sintered carbide or sintered tungsten carbide, or other carbides such as chromium, molybdenum, tantalum or mixed carbides, such as may be used in the forming of teeth of the insert type earlier mentioned herein.

During operation of the cutter, the crests 33 of the teeth depend bottom-most relative to the coned surface 19, and are adapted to roll over and crush the rock at the bottom of the bore hole.

It is to be noted from FIGS. 2 and 3, that the several teeth 28 about the band vary in their circumferential dimensions. This is of advantage in that it enables varying thrusts to be successively applied by the variously sized surfaces of the teeth to the rock, and thereby tends to rapidly fracture the bottom of the hole and crumble rock fragments into minute particles.

A further form which the teeth on a band may take is disclosed in FIGS. 5 and 6. There the teeth are divided into three successive identical groups A, B and C, each group occupying 120° of the periphery of the band 27c. The circumferential expanse of each tooth in a group progresses from a narrowly surfaced tooth 37 at the beginning of each group to a broadly surfaced tooth 38 at the end of each group. This arrangement of the teeth on a band is of advantage in that it permits the application of successively greater tooth surfaces to rock fragments thereby tending to crush them to a relative fine degree.

FIGS. 7 and 8 disclose a band 27d on which all of the teeth 39 are equally spaced and are of identical size and form.

It can be seen from the various forms which the teeth may take on the bands that the different roller cone cutters of a rock bit may be provided with bands having teeth differing in form and arrangement from those on the bands of the other cutters of the same bit. This is of advantage in that as each cutter rolls over the bottom of a bore hole it is prevented from carrying its teeth into the same track of a preceding cutter. It also serves as a means of applying a multiple number of differently formed tooth surfaces to the rock in a drilling operation, whereby fracture and fine fragmentation of the rock is rapidly effected.

FIG. 11 discloses a modification with respect to the contour of the coned surface portion of a roller cone cutter 18a; and FIG. 9 discloses a band 27e having teeth 43. It is noted that the spacing between each band of teeth on the body of the cutter is contoured so as to provide an annular trough as indicated at 41 and 42. The band of teeth shown in FIG. 9 is suited for this form of the cutter. It has a close succession of radially extending teeth 43 about its periphery the peripheral surfaces 44 (FIG. 10) of which are rounded; the bottom outer peripheral portion of each tooth is cut on the bias as indicated by the slope 45 in FIG. 9. By means of this construction, each tooth formed on the band has a sharp crest 46 defining a chisel-like tooth. The combination of a contoured cutter as in FIG. 11 with a band of teeth 43 as shown in FIGS. 9 and 10 is suitable for drilling in relatively softer earth formations wherein deeper penetration is desired. The contoured or annular trough spaces 41 and 42 of the cutter serve to permit deeper penetration of the teeth into the earth; and the chisel-like crest portions of the teeth tend to fracture the earth formation with a slicing action, while the rounded surfaces 44 of the teeth tend to effect a crushing action on the rock fragments.

It is understood that the rounded peripheral surfaces 44 of the teeth shown in FIGS. 9 and 10 may be peaked with the crest of the peak extending in a direction parallel to the axis of the band.

FIG. 12 discloses in side elevation a fragmentary detail of an annular band 27f having a circumferential series of round crested teeth 47 inserted therein formed of wear resistant material such as sintered tungsten carbide.

It is apparent that when any of the bands of teeth of a cutter have become worn or damaged, the band may be removed and replaced with a new one, thereby tending to extend the life of the cutter.

While several embodiments of the invention have been illustrated and described in detail, it is to be expressly understood that the invention is not limited thereto. Various changes can be made in the design and arrangement of the parts without departing from the spirit and scope of the invention; and it is intended, therefore, to claim the invention not only as shown and described but also in all such forms as may reasonably be construed to fall within the spirit of the invention and the scope of the appended claims.

What is claimed is:

1. In a rock bit, a roller cone having a peripheral notch, and an annular band seated fast in said notch having a succession of radially extending cutter teeth about its peripheral surface, wherein each tooth is separated from the next by a vertical groove parallel to the axis of rotation of the band, the teeth are arranged about the band in successive groups, and the teeth in each group vary progressively from one another in their circumferential dimensions.

2. In a rock bit, a roller cone cutter comprising a coned body having a plurality of steps formed in its surface and extending around its periphery in parallel spaced relation to each other and in concentric relation to the axis of the body, and a separate annular band seated fast in each step having a succession of cutter teeth around the band projecting from its peripheral surface, each band having an inner diameter wall co-extensive with and lying flush upon one wall of the related step and having an adjacent wall co-extensive with and lying flush upon a second wall of the step so that no portions of said inner diameter and adjacent walls project beyond the surface of the body to permit outwardly directed thrusts to be made against them during drilling operations.

References Cited

UNITED STATES PATENTS

| | | | |
|---|---|---|---|
| 1,143,275 | 6/1915 | Hughes | 175—373 |
| 1,859,978 | 5/1932 | Metzger | 175—373 |
| 1,896,251 | 2/1933 | Scott | 175—378 |
| 2,037,967 | 4/1936 | DeCosta | 175—340 |
| 2,774,571 | 12/1956 | Morlan | 175—374 |
| 3,000,087 | 9/1961 | Dyer | 29—182.8 |
| 3,018,835 | 1/1962 | Kucera | 175—378 |
| 3,204,710 | 9/1965 | Bechem | 175—372 X |

CHARLES E. O'CONNELL, Primary Examiner.

N. C. BYERS, Assistant Examiner.